Sept. 27, 1927. 1,643,405
R. D. DUNCAN, JR
POLYPHASE HIGH FREQUENCY CURRENT GENERATOR
Filed Oct. 27, 1925 2 Sheets-Sheet 1
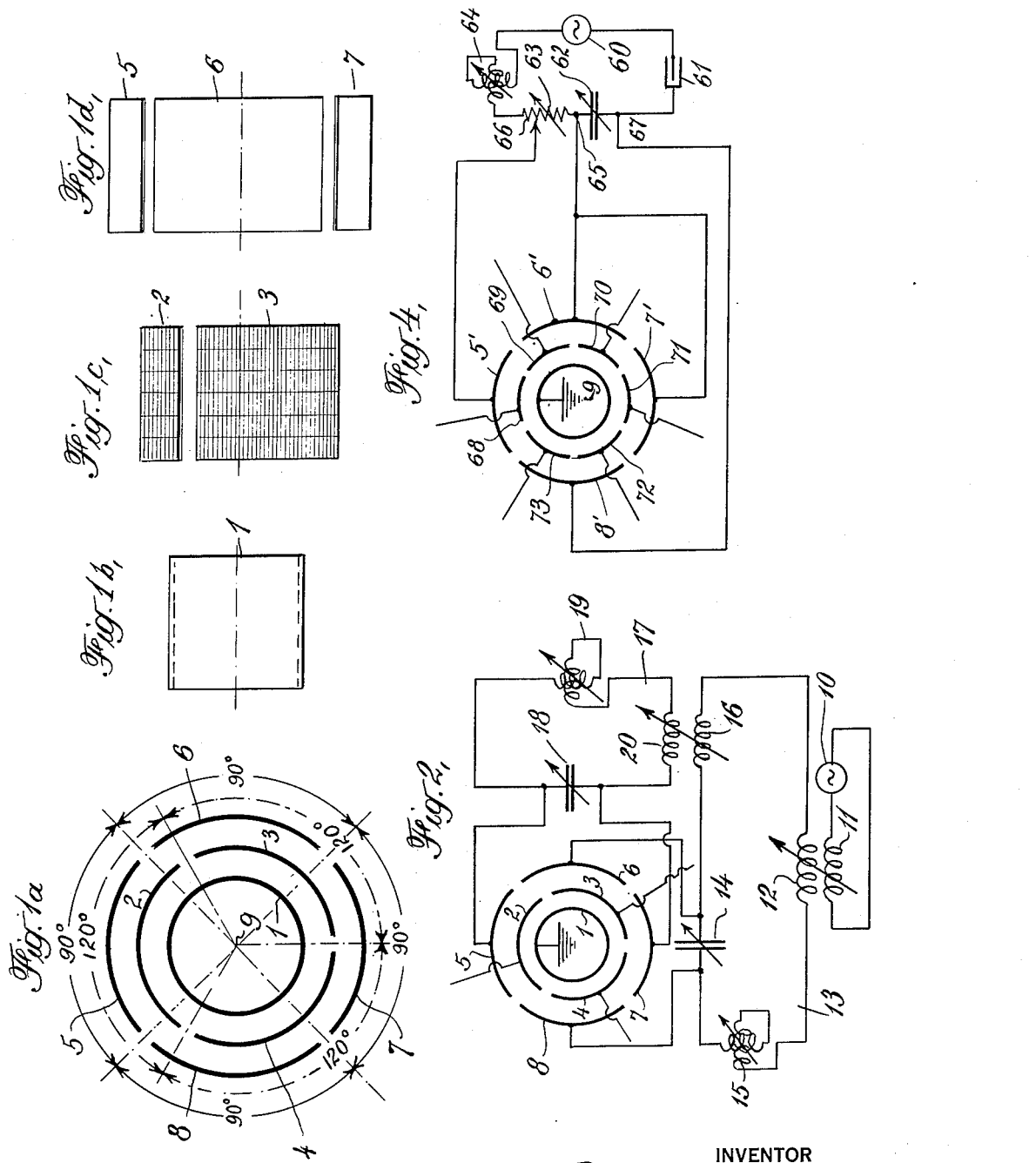
INVENTOR
R.D. Duncan Jr.
BY
Pennie, Davis, Marvin & Edmonds
ATTORNEYS

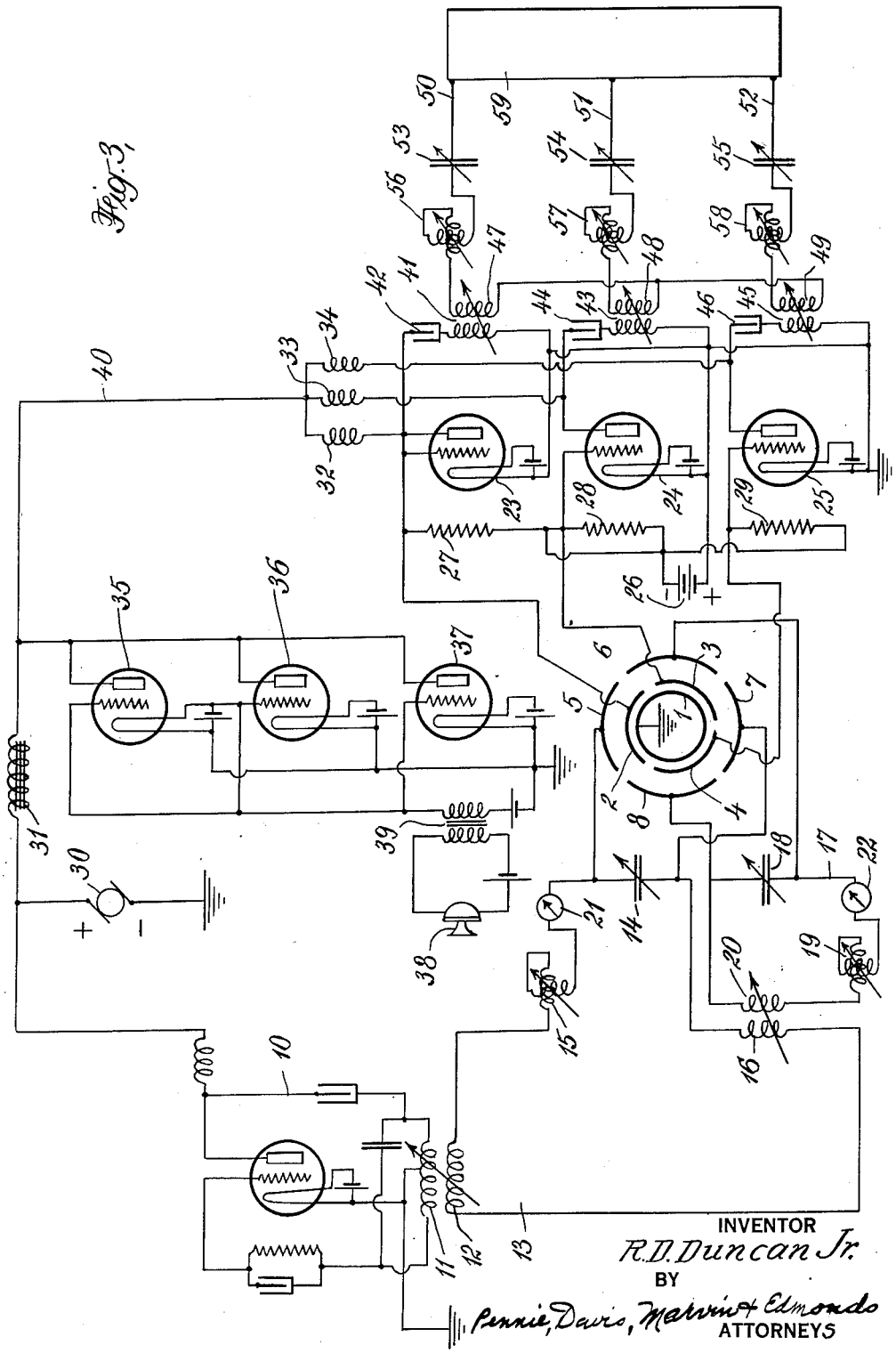

Patented Sept. 27, 1927.

1,643,405

UNITED STATES PATENT OFFICE.

ROBERT D. DUNCAN, JR., OF EAST ORANGE, NEW JERSEY, ASSIGNOR TO WIRED RADIO, INC., OF NEW YORK, N. Y., A CORPORATION OF DELAWARE.

POLYPHASE HIGH-FREQUENCY-CURRENT GENERATOR.

Application filed October 27, 1925. Serial No. 65,125.

This invention has to do with the generation of polyphase high frequency electric currents and relates, more especially, to a polyphase high frequency current generator or converter which is particularly well adapted for use in broadcasting over polyphase electric power transmission lines.

In my copending application, Serial No. 1,374, filed January 9, 1925, I have disclosed a broadcasting system and polyphase generator therefor in which single phase high frequency current is converted into or caused to produce polyphase high frequency carrier current—the object being to secure uniform or substantially uniform distribution of the carrier current to the various subscribers' stations. By the term "subscribers' stations" it is to be understood that what is meant, in general, is a building having an electric lighting or power installation connected to and supplied with electric power from distribution lines on which modulated high frequency carrier current is superimposed on the power current. At each of such subscribers' stations forming a part of an electrical system over which broadcasting is being carried on, the high frequency carrier current is available and the broadcast programs may be received thereat by means of a suitable high frequency receiver tuned to the proper wave-length—it being necessary only to connect the receiving apparatus to the electric light or power wires to effect reception.

In my copending application referred to above, it is shown how two high frequency currents having a phase displacement of ninety degrees may be caused to produce a rotating magnetic field—by means of which polyphase high frequency currents having any desired number of phases may be produced.

According to the present invention, instead of a rotating magnetic field, a rotating electric field is produced and utilized for the production of polyphase high frequency carrier currents. The present invention may be regarded as an alternative arrangement with respect to that disclosed in my above mentioned copending application.

In its broad sense, the present invention includes within its scope the use of a revolving electric field, as distinguished from a revolving magnetic field, for producing alternating or fluctuating or otherwise varying voltages or currents.

In its more specific aspect the invention contemplates and includes within its scope the utilization of a continuously changing electric field for producing alternating voltages and, more particularly, polyphase alternating voltages.

Specifically, the invention consists in producing a revolving electric field by means of a polyphase voltage (for example, two phase) and generating therefrom a polyphase voltage having a different number of phases, as, for example, three phase.

The invention further contemplates the production of polyphase high frequency currents of three phases and upwards by the means referred to in conjunction with broadcasting systems wherein polyphase high frequency currents are modulated and superimposed on polyphase power transmission lines.

An adaptation of the invention as applied to a three phase power transmission system for broadcasting purposes is described in detail hereinafter and illustrated, diagrammatically, by the accompanying drawings, wherein, Figs. 1$^a$, 1$^b$, 1$^c$ and 1$^d$ illustrate what is termed, for convenience, a rotating electric field device—Fig. 1$^a$ being an endwise assembly view and Figs. 1$^b$, 1$^c$ and 1$^d$ being elevational views of the principal elements;

Fig. 2 is a diagrammatic illustration of a polyphase high frequency converter (the term "converter" being, perhaps, more properly applicable than "generator"). This figure illustrates an arrangement whereby single phase may be converted to three phase;

Fig. 3 is a circuit diagram of a combined generator, converter, amplifier, and modulator wherein single phase high frequency current is generated, converted into three phase high frequency current, amplified, modulated in accordance with signals to be broadcast, and impressed upon a three phase power transmission line;

Fig. 4 is a diagrammatic illustration of an alternative converter arrangement whereby single phase high frequency current may be caused to produce two voltages having a phase displacement of ninety degrees and adapted to produce six phase high frequency current.

The rotating electric field device of Figs.

1ª to 1ᵈ, inclusive, comprises a cylindrical conductor element 1, three arcuate conductor elements 2, 3, 4, displaced 120° from each other and four arcuate conductor elements 5, 6, 7 and 8 displaced 90° from each other. The elements 2, 3 and 4 are each preferably perforated or made of woven wire or similar suitable construction as indicated by Fig. 1ᶜ. Each of the several elements, 1 to 8, inclusive, constitutes a plate of a condenser as will presently be evident. Each element 1 to 8, inclusive, is electrically insulated from the others by any suitable dielectric which may, for the most part, be air. No supporting means for these elements is shown but it will be readily understood that in practice a suitable supporting structure would necessarily be provided.

If across the elements 5 and 7 there is connected the terminals of a single phase voltage source, an alternating electric field will be set up between these elements. If another single phase voltage source equal to the first in frequency and intensity is connected across the elements 6 and 8 a second alternating electric field will be set up between the latter elements. If the phase displacement between the two single phase voltages is ninety degrees there will be established a rotating electric field as will be readily understood by those skilled in the art. In other words, there will be set up within the space encompassed by the elements 5, 6, 7, 8 an electric field which is the resultant of the fields previously referred to, the axis of which resultant field rotates continuously about the center 9. (Fig. 1ª.)

It is known that in an electric condenser comprising a pileup of three or more plates insulated from each other wherein only the end plates are connected to a source of voltage, the sum of the voltages between adjacent plates is equal to the overall voltage at any instant. For example, consider a condenser pileup comprising four equally spaced plates, the end plates of which are connected to a source of alternating voltage. If the overall maximum voltage is, say 99 volts the maximum voltage between each pair of adjacent plates is 33 volts—there being three dielectric spaces.

In Fig. 1ª the elements 1, 2, 3 and 4 may be considered as the intermediate plates of a condenser analogously to the intermediate plates of a condenser such as is referred to above by way of example. It is apparent that the rotating electric field will set up voltages between the element 1 and each of the elements 2, 3 and 4 respectively and that each of these voltages will rise and fall and reverse their polarity sinusoidally or approximately so. It is further apparent that these three voltages will have a phase displacement with respect to each other of 120°.

It follows then that a three phase voltage may be produced by means of the device illustrated in Figs. 1ª to 1ᵈ, inclusive, providing a two phase voltage is available. It is furthermore apparent that voltages of any additional number of phases may be produced by similar devices having correspondingly increased numbers of plates corresponding to elements 2, 3 and 4.

In Fig. 2 the rotating electric field device of Fig. 1ª is shown in conjunction with suitable circuit arrangements for converting single phase high frequency voltage into two phase voltage which is in turn converted into three phase in the manner above described. A generator of single phase high frequency current 10 is shown inductively associated through coils 11 and 12 with a circuit 13 which is preferably, although not necessarily tuned to the frequency of source 10. The circuit 13 includes a condenser 14 which may or may not be variable and also includes a variable inductance 15 and coil 16. The variable inductance 15 is not essential but may be convenient for tuning, particularly if condenser 14 is fixed. The terminals of condenser 14 are connected to elements 6 and 8, respectively, of the rotating electric field device.

A second tuned circuit 17 comprising a condenser 18, variable inductance 19 and coil 20 is inductively associated with circuit 13. If coils 16 and 20 are properly coupled, the high frequency voltage across condenser 18 is 90° out of phase with that across condenser 14. No explanation will be offered as to the reasons for this phase displacement, but it may be considered as a fact and will be immediately recognized as such by those skilled in the art.

With the single phase high frequency generator 10 operating and the circuits 13 and 18 properly tuned and coupled, three alternating voltages, 120° out of phase with each other will be developed between grounded element 1 and each of the elements 2, 3 and 4, respectively.

An adaptation of the arrangement of Fig. 2 is shown in combination with vacuum tube amplifiers and modulators in Fig. 3.

In Fig. 3 a vacuum tube oscillator 10 corresponding with the generator 10 of Fig. 2 is shown inductively coupled to a tunable circuit 13, corresponding to circuit 13 of Fig. 2. All the elements of circuit 13, Fig. 3, correspond with those of circuit 13, Fig. 2, except that in the former a milliammeter 21 is included. Likewise, circuit 17 of Fig. 3 corresponds with circuit 17 of Fig. 2 except for the inclusion of a milliammeter 22. The milliammeters provide convenient means for ascertaining the voltages across condensers 14 and 18, respectively. Assuming that these condensers are of exactly equal capacities and that it is desired to impress equal voltages across elements 5, 7 and 6, 8 respectively, it is merely necessary to adjust the currents in circuits 13 and 17 to equality.

The oscillator 10, Fig. 3, may be of any type—the one shown being a well known vacuum tube oscillator.

Three vacuum tube amplifiers of the three electrode type 23, 24 and 25 are shown. The grids of these tubes are connected respectively to the elements 2, 3 and 4 and the filaments are connected through ground to the element 1 of the rotary electric field device.

The grids of the amplifier tubes are preferably given a negative bias. This is provided for in the present instance by means of a biasing battery 26 which is connected to the three grids through high resistances 27, 28 and 29, respectively.

Plate current is supplied to the amplifier tubes 23, 24, 25 by direct current generator 30 through an iron core choke coil 31 and high frequency choke coils 32, 33, 34. Modulator tubes 35, 36, 37 receive their plate voltage from generator 30 through choke coil 31. Choke coil 31 functions in the well-known manner to maintain the current drawn from generator 30 substantially constant. High frequency choke coils 32, 33, 34 in combination with blocking condensers 42, 44, 46 function in the well-known manner to prevent the passage of direct current through the output circuits of tubes 23, 24, 25 and of high frequency current back to source 30, and tubes 35, 36, 37.

Telephonic modulation is effected through the medium of a microphone 38 which is connected in circuit with the primary winding of a suitable transformer 39, the secondary of which is in the parallel grid circuits of the three modulator tubes 35, 36, 37.

Potential variations impressed upon the grids of the modulator tubes, as a result of voice signals or the like picked up by microphone 38, cause corresponding variations in the space impedance of the modulator tubes. The plate circuits of all the amplifier and modulator tubes are in parallel—being connected between conductor 40 and ground—and all receive their current supply from the generator 30 which is likewise connected between conductor 40 and ground. By reason of the high inductance choke coil 31 in series with the generator 30, the current flow is maintained substantially constant. Therefore, any variation in the amount of current diverted through the modulator tubes causes a corresponding effect in the space current of the amplifier tubes. This is in accordance with the principles of socalled constant current modulation.

The high frequency output of the amplifier tubes is accordingly modulated. Although one method of modulation is shown and described it is obvious that other methods may be employed.

The plate or output circuits of the three amplifier tubes 23, 24, 25 include, respectively, the primary windings of high frequency transformers 41, 43 and 45 in series with condensers 42, 44 and 46.

In this system the three high frequency currents each in one of the amplifier output circuits are displaced each from the other by substantially 120°.

The three secondary windings 47, 48, 49 are shown connected in Y to the terminals of a three wire transmission line comprising conductors 50, 51, 52. These may be the conductors of a three wire, three phase power transmission line forming a part of an electric power distribution system. Each of the conductors 50, 51, 52 is shown provided with a variable condenser 53, 54, 55 respectively and a variable inductance 56, 57, 58, respectively, for tuning purposes. The transmission line may thereby be tuned to the high transmitting frequency.

The rectangle 59 is a symbolical representation of a load. This load may be a three phase electric power distribution system connecting with a number of wired radio subscribers' stations as previously defined, or a long polyphase electric power transmission line, or it may be a suitably connected radio antenna or a plurality of antennæ.

The arrangement illustrated in Fig. 3 represents, of course, only one of many satisfactory circuit arrangements which might equally as well be employed, in which the present invention could be embodied.

In Fig. 4 there is shown an alternative arrangement for converting single phase high frequency voltages into two phase and thence into six phase. It could equally as well be applied to the production of any number of phases. In this figure a single phase high frequency oscillator 60 is shown connected in series with condensers 61, 62, resistance 63 and variable inductance 64. The condenser 62 and resistance 63 are preferably variable. The variable inductance 64 may or may not be provided—its provision being a matter of expediency.

It is known that in an alternating current circuit in which is included a capacity and resistance in series, the voltage across the resistance and that across the capacity will, at all times, be substantially 90° out of phase with each other. In the present instance, therefore, the voltage across resistance 63 is at all times 90° out of phase with that across condenser 62. This arrangement therefore provides a source of two phase voltage from which any number of phases may be produced in the manner previously described.

The elements 5', 6', 7' and 8' of Fig. 4 correspond, respectively, to the elements 5, 6, 7 and 8 of Fig. 1ª. The joint terminal 65 of resistance 63 and variable condenser 62 is connected to elements 6' and 7' while the terminals 66 and 67 are connected respectively to elements 5' and 8'. A rotating electric field is thereby produced.

Six perforated arcuate elements 68 to 73, inclusive, corresponding in function to the elements 2, 3 and 4 of Fig. 1ª are disposed within the rotating electric field of Fig. 4, together with a cylindrical element 1' which corresponds with the cylindrical element 1 of Fig. 1ª. Adjacent arcuate elements 68 to 73, inclusive, are displaced from each other by angles of 60°. By this arrangement, it is seen, six phase high frequency voltage is produced. The conductors shown connected to elements 68 to 73, inclusive, may each extend to the grid of an amplifier tube similarly to the arrangement of Fig. 3, and the element 1' may likewise be connected through ground to the filament of the same amplifier tubes. Since the three electrode vacuum tube is, inherently, a voltage operated device, the electric polyphase generator of the type described finds the advantageous application in conjunction with high frequency vacuum tube power amplifiers.

Many variations of the arrangements herein described are contemplated as coming within the scope of this invention and it should not be construed as limited except in accordance with the appended claims.

What is claimed is:

1. In combination, a rotating electric field device comprising four arcuate conductor elements disposed about a common center, each of said elements being situated opposite another one of said elements, a source of two phase voltage, circuit connections for impressing the voltage of one of said phases across two of said arcuate conductor elements, circuit connections for impressing the voltage of the other of said phases across the remaining two of said arcuate conductor elements, the arrangement being such that a resultant rotating electric field is produced within the space encompassed by said arcuate conductor elements, and additional conductor elements disposed within said rotating electric field, the arrangement being such that polyphase voltages of three phase or upwards are produced.

2. In combination, a rotating electric field device comprising four arcuate conductor elements disposed about a common center, each of said elements being situated opposite another one of said elements, a source of two phase voltage, circuit connections for impressing the voltage of one of said phases across two of said arcuate conductor elements, circuit connections for impressing the voltage of the other of said phases across the remaining two of said arcuate conductor elements, the arrangement being such that a resultant rotating electric field is produced within the space encompassed by said arcuate conductor elements, and additional arcuate conductor elements arranged within the said space and concentrically with said four arcuate conductor elements, a cylindrical conductor element disposed concentrically with the previously mentioned arcuate conductor elements, a plurality of three electrode vacuum tube amplifiers each comprising a filament, a grid and a plate, each of said additional arcuate conductor elements being electrically connected to one of said grids individually, high frequency output circuits for said amplifiers and means for modulating the high frequency output of said amplifiers in accordance with signals.

3. A polyphase generator comprising an oscillatory circuit, a source of single phase oscillations for said oscillatory circuit, a second circuit tuned substantially to the frequency of said oscillations and coupled to said oscillatory circuit, said circuits being so corelated and adjusted that the currents flowing therein are substantially ninety degrees out of phase, means for utilizing voltages from said circuits to produce a rotating electric field, means for utilizing said rotating electric field to produce a polyphase voltage having at least three phases, a plurality of vacuum tube amplifiers, at least one for each of said phases, output circuits for said amplifiers, circuit connections between said last mentioned means and said amplifiers whereby said amplifiers are controlled in polyphase order, a source of current for said output circuits, the arrangement being such that the currents in said output circuits are displaced in polyphase relation to each other.

4. A phase converter comprising a plurality of conductor elements disposed symmetrically about a common center, a source of two phase voltage connected to said conductor elements in such a manner as to produce a rotating electric field the lines of force of which are approximately parallel to radials extending from the said common center, and additional conductor elements disposed within said rotating electric field and symmetrically about said common center, the arrangement being such that polyphase voltages of three phases or upwards are produced.

5. In combination, a rotating electric field device comprising four conductor elements disposed symmetrically about a common center, each of said elements being situated opposite another one of said elements, a source of two phase voltage, circuit connections for impressing the voltage of one of said phases across two of said conductor elements, circuit connections for impressing the voltage of the other of said phases across the remaining two of said conductor elements, the arrangement being such that a resultant rotating electric field is produced within the space encompassed by said conductor elements, and additional conductor elements arranged within said space and concentrically with said first mentioned conductor elements, another conductor element situated at approximately the center of said rotating electric field and concentrically with the previously mentioned conductor elements, a plurality of three-electrode vacuum tube amplifiers each comprising a filament, a grid and a plate, each of said second mentioned conductor elements being electrically connected to one of said grids individually, high frequency output circuits for said amplifiers and means for modulating the high frequency output of said amplifiers in accordance with signals.

In testimony whereof I affix my signature.

ROBERT D. DUNCAN, Jr.